United States Patent
Serizawa et al.

(10) Patent No.: US 8,018,695 B2
(45) Date of Patent: Sep. 13, 2011

(54) FUEL PUMP CONTROL APPARATUS

(75) Inventors: Akira Serizawa, Makinohara (JP); Hiroo Yabe, Susono (JP); Sadafumi Ikeda, Chigasaki (JP); Kouji Manabe, Hadano (JP); Akira Teranishi, Atsugi (JP); Hironobu Takahashi, Ebina (JP)

(73) Assignee: Yazaki Corporation, Tokyo (JP)

( * ) Notice: Subject to any disclaimer, the term of this patent is extended or adjusted under 35 U.S.C. 154(b) by 154 days.

(21) Appl. No.: 12/398,542

(22) Filed: Mar. 5, 2009

(65) Prior Publication Data

US 2009/0224714 A1    Sep. 10, 2009

(30) Foreign Application Priority Data

Mar. 6, 2008    (JP) ................... 2008-056166

(51) Int. Cl.
*H02H 7/08*    (2006.01)
(52) U.S. Cl. .......... 361/31; 307/24; 307/51; 307/52; 323/223; 323/224; 361/30; 361/23; 361/25; 318/432; 318/434
(58) Field of Classification Search ............ 361/31, 361/30, 23, 25; 318/432, 434; 307/10.6, 307/24, 51, 52; 323/223, 224
See application file for complete search history.

(56) References Cited

U.S. PATENT DOCUMENTS

| | | | | |
|---|---|---|---|---|
| 5,801,504 | A * | 9/1998 | Endo et al. | 318/434 |
| 5,811,948 | A * | 9/1998 | Sato et al. | 318/434 |
| 6,877,490 | B2 * | 4/2005 | Nishioka et al. | 123/520 |
| 7,157,874 | B2 * | 1/2007 | Nomura et al. | 318/432 |
| 7,287,501 | B2 * | 10/2007 | Yamada | 123/179.4 |
| 7,316,217 | B2 * | 1/2008 | Yamada | 123/397 |
| 7,759,891 | B2 * | 7/2010 | Serizawa et al. | 318/434 |
| 2006/0204367 | A1 * | 9/2006 | Meza et al. | 417/53 |
| 2008/0048598 | A1 * | 2/2008 | Shibuya | 318/400.1 |

FOREIGN PATENT DOCUMENTS
JP    2000-240522 A    9/2000

* cited by examiner

*Primary Examiner* — Rita Leykin
(74) *Attorney, Agent, or Firm* — Sughrue Mion, PLLC

(57) ABSTRACT

A control apparatus for controlling a fuel pump includes: an electronic switch provided in a circuit for connecting a power supply to a motor for driving the fuel pump; a current detector which detects a current which flows through the motor; and a controller which controls the electronic switch in a first PWM mode of a first frequency and a first duty ratio in a normal operation; and change a PWM mode to control the electronic switch in a second PWM mode of a second frequency lower than the first frequency and a second duty ratio lower than the first duty ratio when the current flowing through the motor exceeds a threshold current value in the normal operation.

6 Claims, 4 Drawing Sheets

FUEL PUMP CONTROL APPARATUS

BACKGROUND OF THE INVENTION

1. Technical Field

The present invention is related to a control apparatus which controls driving operations of a fuel pump to be mounted on a vehicle.

2. Background Art

While motors for driving fuel pumps to be mounted on vehicles are connected via electronic switches to batteries, the electronic switches are driven based upon a PWM signal having a predetermined frequency and a predetermined duty ratio, so that electric power is supplied to the motors in PWM control modes so as to be rotated.

Further, in a case that foreign articles such as dust are mixed into fuel, there are some possibilities that the mixed foreign articles may be meshed with vanes of the fuel pumps, and pipes of the fuel pumps may be clogged with the foreign articles. In such a case, the motors of the fuel pumps are locked, and thus, locking currents continuously flow through the motors. As a result, various sorts of electronic components such as the motors, wiring lines, and switches must be designed with employment of such an assumption that the above-described locking currents may continuously flow through these electronic components. In other words, diameters of the wiring lines and heat resisting temperatures of the switches must be determined, so that these electronic components are not electrically damaged even when such locking currents continuously flow through these electronic components. In addition, heat radiating constructions for radiating heat are required, while the heat is generated because the locking currents flow through these electronic components, which may conduct the below-mentioned drawbacks: That is, large-scaled circuits are necessarily required, and manufacturing cost is increased (see JP-A-2000-240522, for example).

In the fuel pump control apparatuses, when the motors for driving the fuel pumps are locked, the locking currents continuously flow through the motors. As a result, the above-mentioned fuel pump control apparatuses have such a problem that the electronic component must be designed in order that these electronic components can endure the above-described locking currents, and also, the heat radiating constructions are necessarily required.

The present invention has been made to solve the above-described problems of the above technique, and therefore, has an object to provide such a fuel pump control apparatus. That is, when a locking current flows through a motor for driving a fuel pump, the fuel pump control apparatus is capable of suppressing heat which is generated in connection with the locking current, and eventually, capable of making a circuit scale thereof compact.

SUMMARY OF THE INVENTION

To achieve the above-described object, according to an aspect of the present invention, there is provided a control apparatus for controlling a fuel pump, including: an electronic switch provided in a circuit for connecting a power supply to a motor for driving the fuel pump; a current detector which detects a current which flows through the motor; and a controller which controls the electronic switch in a first PWM mode of a first frequency and a first duty ratio in a normal operation; and changes a PWM mode to control the electronic switch in a second PWM mode of a second frequency lower than the first frequency and a second duty ratio lower than the first duty ratio when the current flowing through the motor exceeds a threshold current value in the normal operation.

According to the aspect of the present invention, in such a case that the fuel pump is locked and thus the motor for driving the fuel pump is forcibly stopped, the first frequency of the PWM signal is changed into the second frequency lower than the first frequency and also the first duty ratio of the PMM signal is changed into the second duty ratio lower than the first duty ratio, so that the current flowing through the motor when the fuel pump is locked can be reduced. As a consequence, the circuit structural elements such as wiring lines and transistors can be made compact and in small scales.

In the aspect of the present invention, when a set time has elapsed after the controller has changed the PWM mode from the first PWM mode to the second PWM mode, the controller may return the PWM mode from the second PWM mode to the first PWM mode.

Further, the controller may repeat an operation of changing and returning the PWM mode until a locking state of the fuel pump is released According to the above-mentioned configuration, in such a case that the fuel pump has been locked, the first frequency of the PWM signal has been changed into the second frequency, and the first duty ratio of the PWM signal has been changed into the second duty ratio, after a set time has elapsed, these second frequency and second duty ratio of the PWM signal are again returned to the first frequency and the first duty ratio. Then, in the case that the locking state has not yet been avoided, the operation for changing the first frequency and the first duty ratio into the second frequency and the second duty ratio is repeatedly carried out. As a consequence, in the case that the locking state of the fuel pump is avoided, the frequency of the PWM signal can become the first frequency corresponding to such a frequency during the normal operation, and the duty ratio of the PWM signal can become the first duty ratio corresponding to such a duty ratio during the normal operation. Accordingly, even when the locking state of the fuel pump occurs, the driving motor thereof is not stopped, and when the locking state is avoided, the fuel pump can be continuously driven.

In the aspect of the present invention, the second frequency and the second duty ratio may be set, so that the current drops to a zero value when the electronic switch is turned OFF.

According to the above-mentioned configuration, in such a case that the fuel pump has been locked, the first frequency of the PWM signal has been changed into the second frequency, and the first duty ratio of the PWM signal has been changed into the second duty ratio, when the electronic switch is turned OFF, the current flowing through the electronic switch drops to a zero value, so that a large torque change may be produced in the driving motor. As a result, vibrations may be generated in the fuel pump, and when a foreign article is meshed with the fuel pump, this foreign article can be easily disconnected from the fuel pump, and eventually, the locking state can be readily avoided.

In the aspect of the present invention, the first frequency may be higher than or equal to 1 KHz; the second frequency may be selected to be 10 to 100 Hz; the first duty ratio may be selected to be 50 to 100%; and the second duty ratio may be lower than or equal to 10%.

According to the above-mentioned configuration, the first frequency is selected to be 1 KHz and the first duty ratio is selected to be 50 to 100%, so that the current to be supplied to the driving motor can be stabilized, and on the other hand, the second frequency is selected to be 10 to 100 Hz and the second duty ratio is selected to be lower than, or equal to 10%, so that a large torque change may be generated in the driving motor so as to vibrate the fuel pump. When the foreign articles have been meshed with the fuel pump, these meshed foreign articles can be easily disconnected from the fuel pump.

In the aspect of the present invention, the second frequency may be selected to be a frequency obtained by multiplying or dividing a characteristic frequency of the fuel pump by an integer.

According to the above-mentioned configuration, since the second frequency is set to such a frequency obtained by multiplying or dividing the characteristic frequency of the fuel pump by any integer, in such a case that the electronic switch is driven at this second frequency, the vibrations occurred in the fuel pump may be emphasized with each other, so that the foreign articles meshed with vanes of the fuel pump can be more easily disconnected therefrom.

In the fuel pump control apparatus according to the present invention, in such a case that the motor for driving the fuel pump is locked and thus the fuel pump driving motor is forcibly stopped, the PWM signal is controlled in such a manner that the frequency and the duty ratio of the PWM signal are lowered. As a result, the current flowing through the driving motor when the driving motor is locked can be reduced, so that the heat generations when the motor for driving the fuel pump is locked can be suppressed.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

Figure 1:
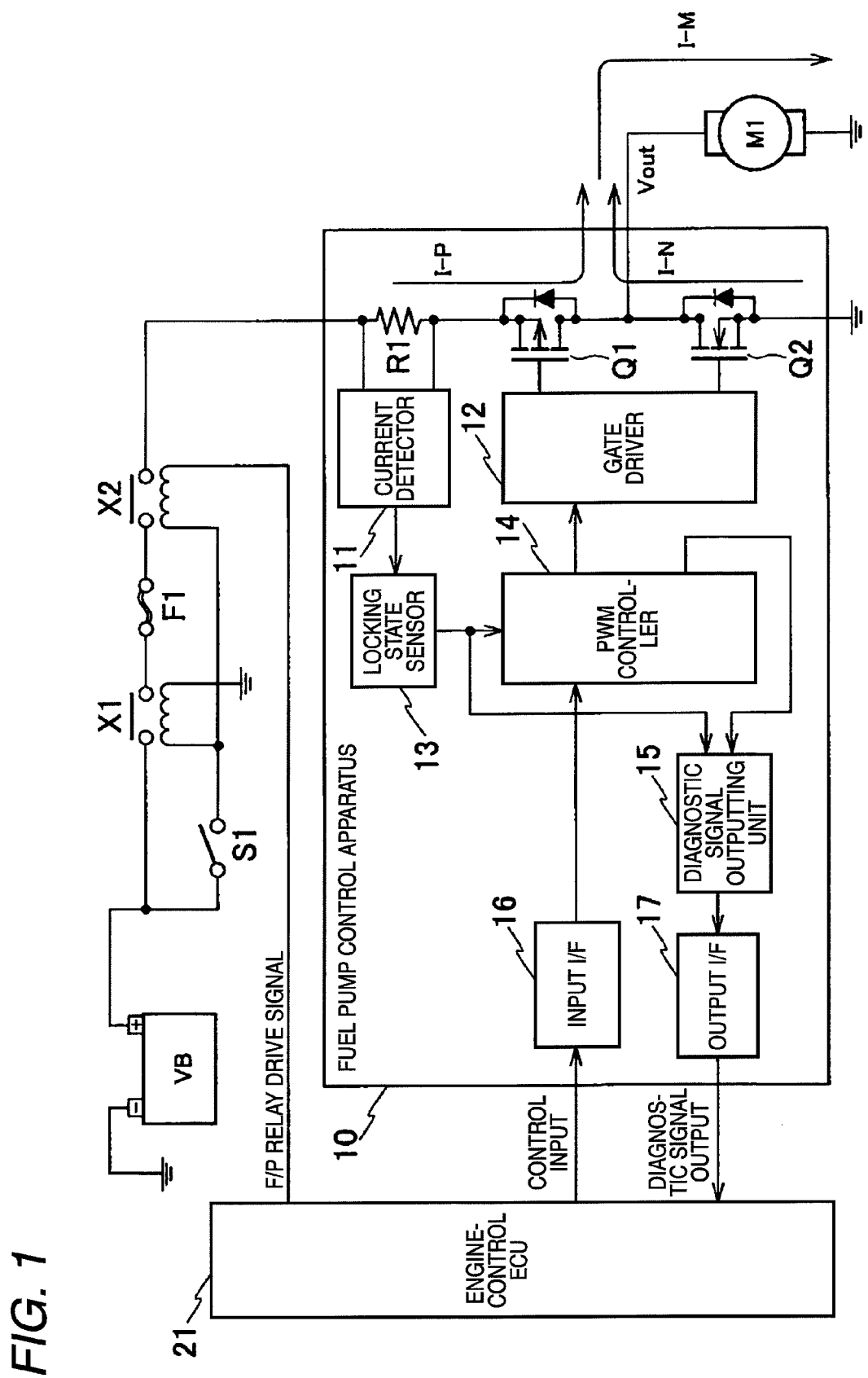
FIG. 1 is a circuit diagram for showing a driving circuit of a fuel pump, which contains a fuel pump control apparatus according to an embodiment of the present invention.

Referring now to drawings, a description is made of various embodiments of the present invention. FIG. 1 is an explanatory diagram for showing a driving circuit of a fuel pump, which contains a fuel pump control apparatus 10 according to an embodiment of the present invention.

As shown in FIG. 1, an IGN relay "X1", a fuse "F1", a fuel pump relay "X2", a shunt resistor "R1" (namely, current detecting means), and a transistor "Q1" (namely, electronic switch) such as a P-channel MOSFET are provided between a battery "VB" and a motor "M1." The battery VB is mounted on a vehicle (not shown), and the motor M1 is employed to drive a fuel pump (not shown). Furthermore, another transistor "Q2" such as an N-channel MOSFET are provided in a parallel to the motor M1.

The IGN relay X1 is energized when an ignition switch "S1" mounted on the vehicle is turned ON, so that an OFF state of the IGN relay X1 is switched to an ON state.

The fuel pump relay X2 is energized when an F/P drive signal is supplied from an engine-control ECU 21, so that an OFF state of the fuel pump relay X2 is switched to an ON state. For instance, in such a case that a signal for initiating an air bag is generated, the F/P drive signal becomes an OFF state, so that the circuit is cut off in order to stop the rotations of the motor M1.

The fuel pump control apparatus 10 for controlling the driving operations of the motor M1 includes the shunt resistor R1, the transistor Q1, and the transistor Q2, and further includes a current detector (namely, current detecting means) 11, a gate driver 12, a locking state sensor 13, a PWM (Pulse-Width Modulation) controller (namely, control means) 14, a diagnostic signal outputting unit 15, an input I/F (Inter-Face) 16, and an output I/F 17. The current detector 11 is arranged by employing, for instance, a microcomputer, and the like. The input I/F 16 and the output I/F 17 eliminate noises and adjust levels.

The current detector 11 detects a voltage generated between both terminals of the shunt resistor R1, and also, detects a current "I-P" which flows through the transistor Q1 based upon the detected voltage value and a resistance value of the shunt resistor R1.

The locking state sensor 13 compares a current value detected by the current detector 11 with a preset threshold current value of a locking state current (for example, 5.9 [A] of predetermined threshold current value), and then, outputs a locking state signal when a current value detected by the current detector 11 exceeds the threshold current value. The locking state signal is output to the PWM controller 14 and the diagnostic signal outputting unit 15.

The PWM controller 14 produces a PWM signal based upon a control signal of the fuel pump which is entered to the PWM controller 14 from the engine-control ECU 21 via the input I/F 16. In other words, when a setting signal for setting a rotation number of the motor M1 is entered from the engine-control ECU 21 to the PWM controller 14, the PWM controller 14 produces a PWM signal having such a duty ratio adapted to the above-described rotation number, and then, outputs the produced PWM signal to the gate driver 12. When the locking state signal is entered from the locking state sensor 13 to the PWM controller 14, the PWM controller 14 changes a frequency and a duty ratio of a PWM signal in accordance with a processing sequence. The process will be explained later.

The gate driver 12 outputs drive signals to gates of the respective transistors Q1 and Q2 based upon the PWM signal output from the PWM controller 14 in order to turn ON and/or OFF the respective transistors Q1 and Q2 at desirable frequencies and desirable duty ratios. In this case, a dead time is set in order that the two transistors Q1 and Q2 are not turned ON at the same time.

When a locking state signal is output from the locking state sensor 13, the diagnostic signal outputting unit 15 produces a diagnostic signal, and then, outputs the produced diagnostic signal via the output I/F 17 to the engine-control ECU 21. As a result, the ECU 21 actuates either a warning lamp or produces a warning sound in order to notify a passenger of the vehicle that the fuel pump is brought into a locking state.

Next, operations of the fuel pump control apparatus 10 with employment of the above-described arrangement will now be described with reference to a flow chart shown in FIG. 2, and timing charts indicated in FIG. 3 and FIG. 4. When an F/P relay drive signal is output from the engine-control ECU 21 shown in FIG. 1, as shown in FIG. 3(a), the relay X2 is turned ON, so that the fuel pump control apparatus 10 is electrically connected to the battery VB. In addition, as shown in FIG. 3(b), when a control signal is entered from the engine-control ECU 21 to the fuel pump control apparatus 10, the fuel pump control apparatus 10 starts to drive the fuel pump. In other words, as a drive condition in the normal operation, the PWM controller 14 produces such a PWM signal having a frequency of 6 KHz (namely, first frequency higher than or equal to 1 KHz), and a duty ratio of 50% (namely, first duty ratio of 50 to 100%). Then, the PWM controller 14 outputs the produced PWM signal to the gate driver 12. This state is called a "first PWM mode" in the embodiment.

As a consequence, in response to the above-described PWM signal, the gate driver 12 turns ON and OFF the transistor Q1, and also, turns ON and OFF the transistor Q2 at a timing which is reversed with respect to the timing for turning ON and OFF the transistor Q1 with providing the dead time. As a result, as shown in FIG. 3(c), a voltage "Vout" is generated between the terminals of the motor M1, which is changed in a periodic manner.

At this time, a current "I-P" shown in FIG. 3(e) which is changed in conjunction with the voltage "Vout" flows from the transistor Q1 to the motor M1, and furthermore, another current "I-N" indicated in FIG. 3(f) flows from the transistor Q2 to the motor M1. Thus, as represented in FIG. 3(d), a current "I-M" flows through the motor M1, while the current "I-M" has a plus current value and a waveform changed in a sawtooth form. As a result, the motor M1 is rotated in a desirable rotation number so as to rotate the fuel pump, so that fuel is supplied.

Now, when the fuel pump is locked at a time instant "t0" shown in FIG. 3 and thus the rotation of the motor M1 is forcibly blocked, as indicated in FIG. 3(e), the current "I-P" flowing through the transistor Q1 is increased, and furthermore, as shown in FIG. 3(d), the current "I-M" flowing through the motor M1 is increased. As a result, the voltage between both the terminals of the shut resistor R1 indicated in FIG. 1 is increased. The locking state sensor 13 judges that the current "I-P" exceeds a threshold current value "Ith" (for instance, 5.9 A) ("YES" in step S1 of FIG. 2), and therefor, the locking state sensor 13 outputs a locking state signal to the PWM controller 14.

Figure 2:
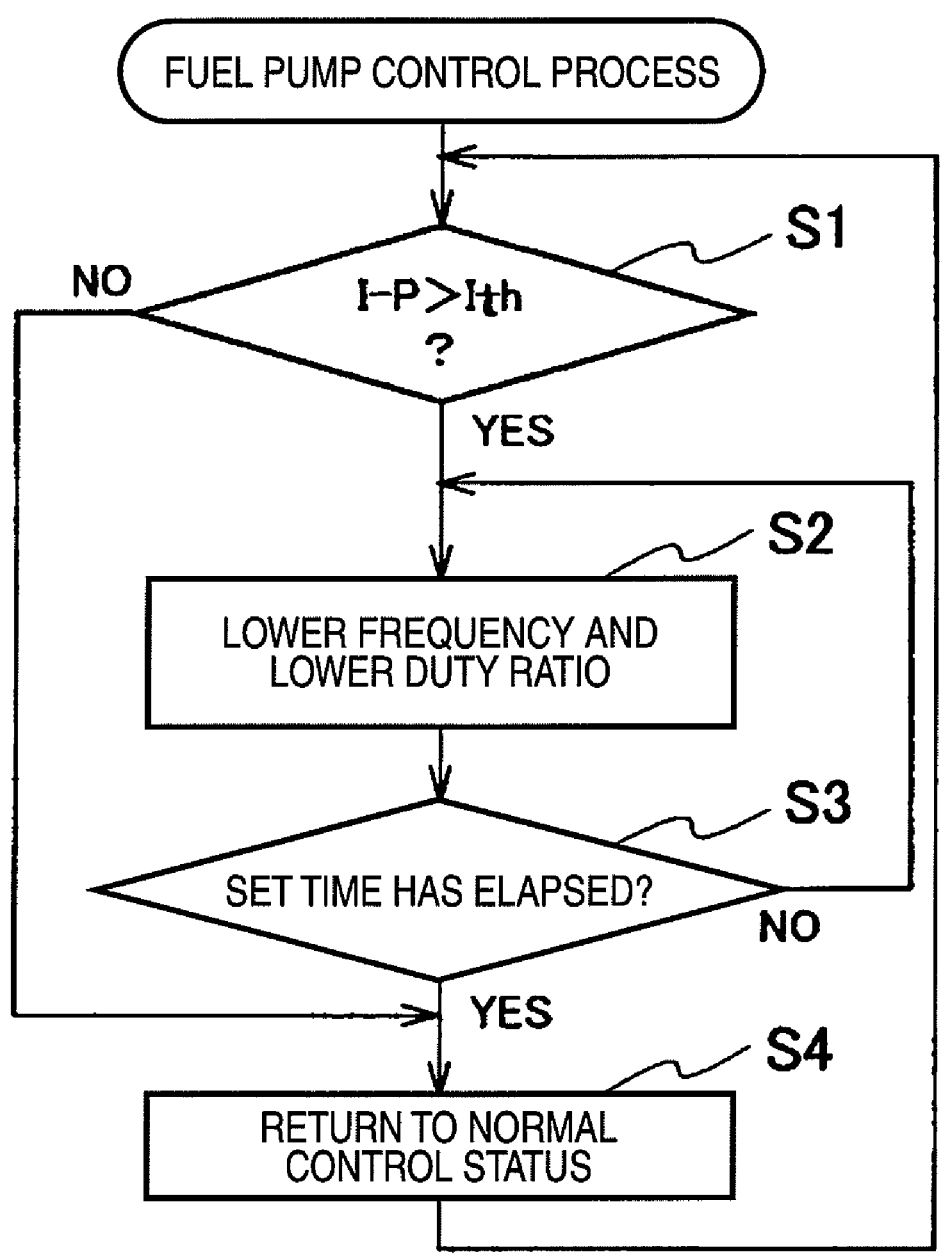
FIG. 2 is a flow chart for describing a process sequence executed by the fuel pump control apparatus according to the embodiment of the present invention.
Figure 3:
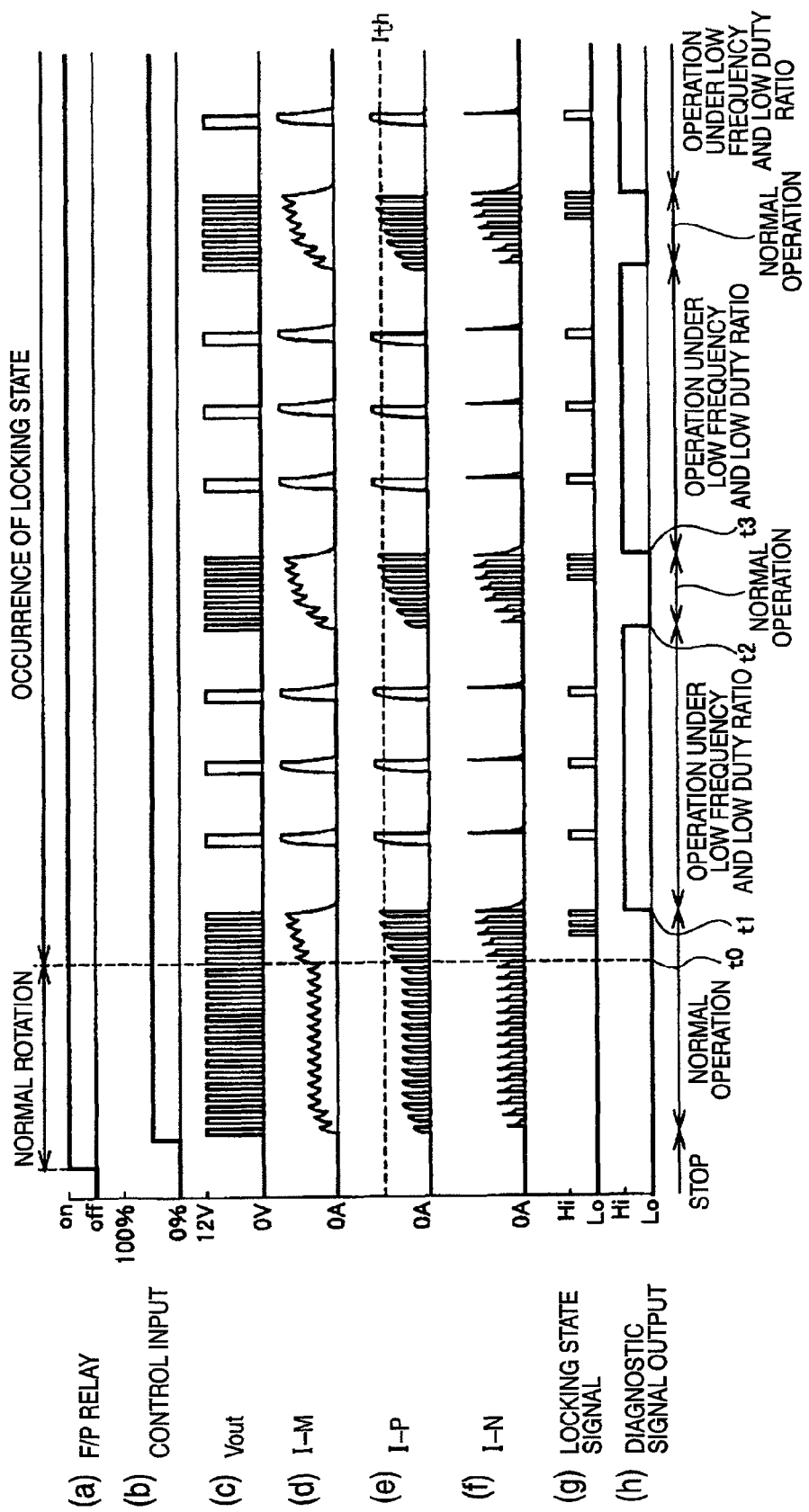
FIG. 3 is a timing chart for representing waveforms of respective signals generated in the fuel pump control apparatus according to the embodiment of the present invention, and indicates such a case that locking state is maintained.

When the locking state signal is input to the PWM controller 14, the PWM controller 14 changes the frequency of the PWM signal into such a frequency (namely, second frequency of 10 to 100 [Hz]) which is lower than the above-described first frequency by, for example, approximately 10 [Hz], and moreover, changes the duty ratio of the PWM signal into such a duty ratio (namely, second duty ratio of 10% or low) which is lower than the above-explained first duty ratio by, for example, approximately 10% (step S2 of FIG. 2). This state is called a "second PWM mode" in the embodiment.

As a result, as represented at a time instant "t1" to a time instant "t2" of FIG. 3, a voltage Vout generated between the terminals of the motor M1 has a lower frequency and a waveform whose duty ratio is lower than those of the voltage Vout under the normal operation. In connection with this change in the voltage Vout, since the currents "I-P" and "I-N" are changed as indicated in FIG. 3(e) and FIG. 3(f), the current "I-M" flowing through the motor M1 becomes such an interrupted waveform (namely, waveform in which current value drops to a zero value when transistor Q1 is turned OFF), as shown in FIG. 3(d). As a consequence, the current "I-M" flowing through the motor M1 can be reduced, so that such a current which flows through the motor M1 when the motor M1 is locked can be decreased.

Further, in such a case that the locking state signal is output from the locking state sensor 13, this locking state signal is output to the diagnostic signal outputting unit 15. The PWM controller 14 outputs such a changing signal for indicating that both the frequency and the duty ratio of the PWM signal are changed to the diagnostic signal outputting unit 15. When the locking state signal and the changing signal are entered to the diagnostic signal outputting unit 15, the diagnostic signal outputting unit 15 outputs a diagnostic signal via the output I/F 17 to the engine-control ECU 21. In such a case that the above-described diagnostic signal is input to the engine-control ECU 21, the engine-control ECU 21 notifies the passenger that the fuel pump is locked by operating a lamp, a buzzer, and the like, which are not shown.

Moreover, in the case that the locking state signal is entered from the locking state sensor 13 to the PWM controller 14, the PWM controller 14 measures an elapse of time from a time instant when the locking state signal was input from the locking state sensor 13. Then, when the lapsed time becomes equal to a set time (for instance, 2 seconds) ("YES" in step S3 of FIG. 2), the PWM controller 14 returns the frequency and the duty ratio of the PWM signal to the original states thereof (step S4 of FIG. 2). In other words, the PWM controller 14 executes a mode change from the second PWM mode to the first PWM mode to change the frequency of the PWM signal to 6 [KHz] (first frequency), and to change the duty ratio to 50% (first duty ratio).

As a result, at a time instant "t2" indicated in FIG. 3, the waveform of the voltage Vout is changed into the waveform during the normal operation. Then, in such a case that the locking state of the fuel pump is now yet avoided at this time instant "t2" and the locking current continuously flows, the PWM controller 14 again performs such a process operation that the frequency of the PWM signal is changed to 10 [Hz] and the duty ratio thereof is changed to 10%, so that the current flowing through the motor M1 is reduced. These process operations are repeatedly carried out until the locking state of the fuel pump is released.

Figure 4:
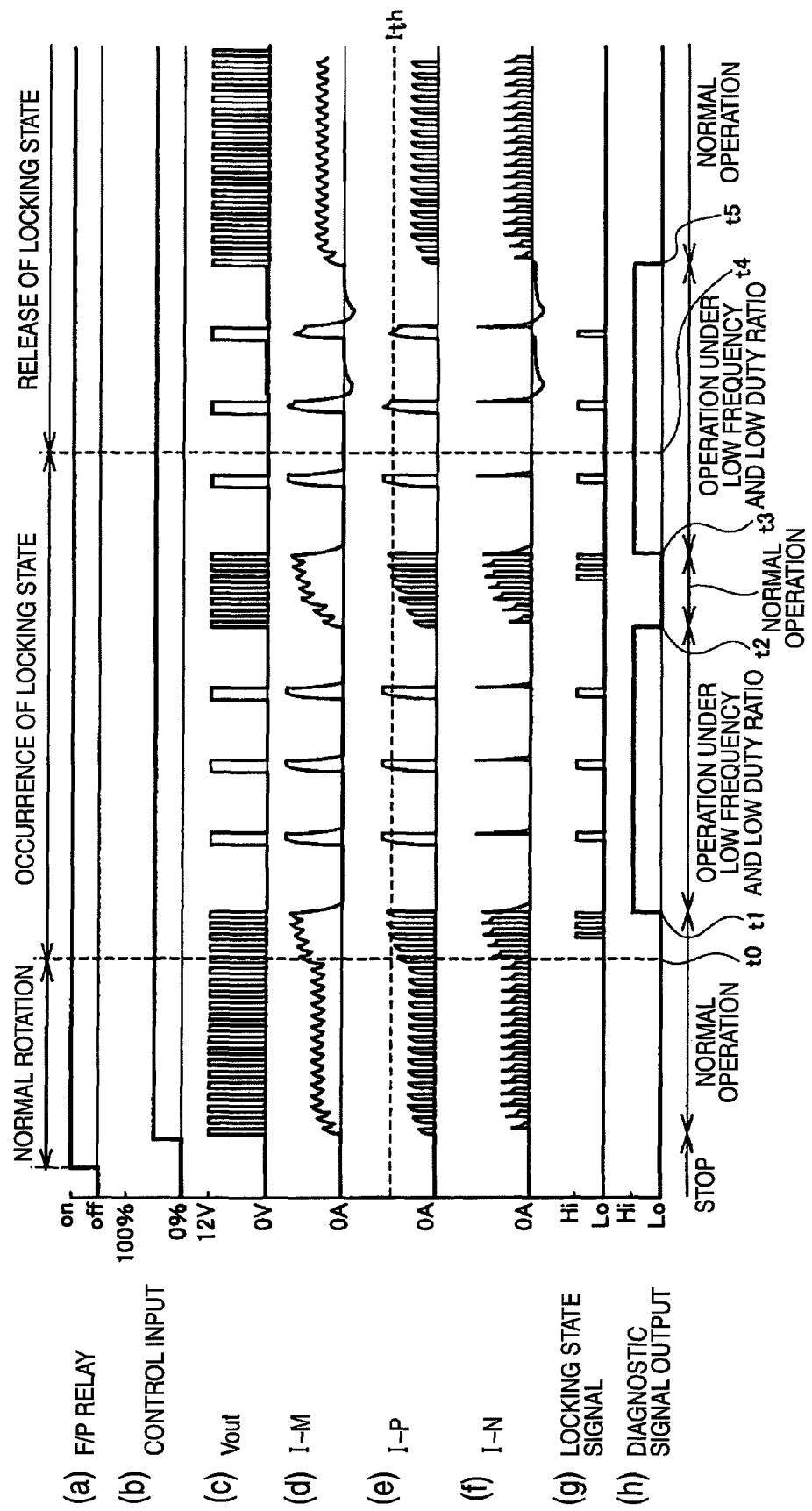
FIG. 4 is a timing chart for representing waveforms of respective signals generated in the fuel pump control apparatus according to the embodiment of the present invention, and indicates such a case that after the fuel pump has been brought into the locking state, the locking state is released.

As represented in FIG. 4, there is a case that the locking signal is input to the PWM controller 14 at the time instant "t3" and thereafter the locking state of the fuel pump is released at a time instant "t4". After the frequency and the duty ratio of the PWM signal are returned to the normal condition at a time instant "t5", the current "I-P" becomes lower than or equal to the threshold current value "I th" (for example, 5.9 [A]). As a result, thereafter, the frequency and the duty ratio of the PWM signal are not changed, and the normal condition is maintained. In other words, the fuel pump is once brought into the locking state, and thereafter, when the locking state is avoided, the fuel pump is returned to the normal drive condition.

As previously described, in the fuel pump control apparatus 10 according to the present embodiment, in such a case that the motor M1 for driving the fuel pump is brought into the locking state because the foreign articles are meshed with the fuel pump, so that the locking current flows through the transistor Q1, the locking state is detected by the locking state sensor 13 based upon the current "I-P" detected by the current detector 11. Then, when the locking state sensor 13 senses that the motor M1 is brought into the locking state, the PWM controller 14 decreases the frequency of the PWM signal and the duty ratio of the PWM signal so as to drive the transistors Q1 and Q2 based upon the resulting PWM signal having the low frequency and the low duty ratio. Accordingly, the current flowing through the motor M1 is reduced, so that heat generation amounts related to the motor M1, the wiring lines, and the respective transistors Q1 and Q2 are reduced.

As a result, various sorts of the structural elements such as the wiring lines, and the transistors for constructing the driving circuit of the fuel pump are no longer designed in such a specification capable of enduring large currents, and the diameters of the wiring lines can be made narrow. Furthermore, heat resisting characteristics of transistors such as MOSFETs can be realized as low heat resisting characteristics. As a consequence, the entire circuit scale of the fuel pump control apparatus can be made simple, in a small space, and in low cost.

In addition, in such a case that the locking state is detected so that both the frequency and the duty ratio of the PWM signal are lowered, after a set time (for example, 2 seconds) has elapsed, the operation for returning the lowered frequency and the lowered duty ratio of the PWM signal to the original values, which is repeatedly carried out; and when the locking state is avoided, the motor M1 is restored to be operated under normal condition. Accordingly, even if the motor M1 is brought into the locking state, the motor M1 can be continuously driven without any interruption.

Moreover, as can be understood from the waveform of the current "I-M" defined from the time instant "t1" to the time instant "t2" represented in FIG. 3(d), while the locking state is detected, the current "I-M" has such a waveform which is changed in an interrupted manner, namely, a current waveform in which the current drops to the zero value when the transistor Q1 is turned OFF. As a result, the torque generated from the motor M1 is largely varied in the periodic manner, so that interrupted vibrations may be generated in the vanes of the fuel pump. Thus, in such a case that, for example, the foreign articles are meshed with the vanes of the fuel pump, the foreign articles can be easily disconnected from the vanes due to the interrupted vibrations, so that the locking state can be easily avoided.

Also, the vibrations generated in the fuel pump may be emphasized with each other at such frequencies which are defined by multiplying or dividing the characteristic frequency of the fuel pump by an integer. Under such a circumstance, while the characteristic frequency of the fuel pump is previously measured, the frequency of the PWM signal when the locking state is detected is set to be such a frequency defined by multiplying or dividing the characteristic frequency of the fuel pump by any integer. As a result, when the locking state occurs, stronger vibrations may be produced in order that the foreign articles meshed with the vanes of the fuel pump may be disconnected in an easier manner. In this case, the characteristic frequency of the fuel pump may be measured in various manners, namely, the characteristic frequency may be calculated based upon the construction of this fuel pump, or alternatively, vibrations may be actually applied to the fuel pump while the frequency is changed so as to measure magnitudes of the vibrations.

Although the above-described embodiment has exemplified 6 KHz as one example of the first frequency, it is desirable to select such frequencies higher than or equal to 1 KHz as the first frequency. Furthermore, although the above-explained embodiment has exemplified 50% as one example of the first duty rate, it is preferable to select 50 to 100% as the first duty ratio.

Although the above-described embodiment has exemplified 10 Hz as one example of the second frequency, it is desirable to select such frequencies from 1 to 100 Hz as the first frequency. Furthermore, although the above-explained embodiment has exemplified 10% as one example of the second duty rate, it is preferable to select 1 to 10% as the second duty ratio.

While the fuel pump control apparatus of the present invention is described based upon the embodiments illustrated in the drawings, the present invention is not limited only to these embodiments. Accordingly, the structural elements of the fuel pump control apparatus may be replaced by arbitrarily selected structural elements having similar functions.

Even when the fuel pump is locked, the fuel pump control apparatus has a great merit capable of suppressing the current value, and continuously driving the fuel pump.

What is claimed is:

1. A control apparatus for controlling a fuel pump, comprising:
   an electronic switch provided in a circuit for connecting a power supply to a motor for driving the fuel pump;
   a current detector which detects a current which flows through the motor; and
   a controller which controls the electronic switch in a first PWM mode of a first frequency and a first duty ratio in a normal operation; and changes a PWM mode to control the electronic switch in a second PWM mode of a second frequency lower than the first frequency and a second duty ratio lower than the first duty ratio when the current flowing through the motor exceeds a threshold current value in the normal operation,
   wherein the second frequency and the second duty ratio are set, so that the current drops to a zero value when the electronic switch is turned OFF.

2. A control apparatus for controlling a fuel pump, comprising:
   an electronic switch provided in a circuit for connecting a power supply to a motor for driving the fuel pump;
   a current detector which detects a current which flows through the motor; and
   a controller which controls the electronic switch in a first PWM mode of a first frequency and a first duty ratio in a normal operation; and changes a PWM mode to control the electronic switch in a second PWM mode of a second frequency lower than the first frequency and a second duty ratio lower than the first duty ratio when the current flowing through the motor exceeds a threshold current value in the normal operation,
   wherein the second frequency and the second duty ratio are set, so that the current drops to a zero value when the electronic switch is turned OFF, and
   wherein when a set time has elapsed after the controller has changed the PWM mode from the first PWM mode to the second PWM mode, the controller returns the PWM mode from the second PWM mode to the first PWM mode.

3. The control apparatus as claimed in claim 1, wherein the first frequency is higher than or equal to 1 KHz; the second frequency is selected to be 10 to 100 Hz; the first duty ratio is selected to be 50 to 100%; and the second duty ratio is lower than or equal to 10%.

4. The control apparatus as claimed in claim 1, wherein the second frequency is selected to be a frequency obtained by multiplying or dividing a characteristic frequency of the fuel pump by an integer.

5. The control apparatus as claimed in claim 2, wherein the controller repeats an operation of changing and returning the PWM mode until a locking state of the fuel pump is released.

6. A control apparatus for controlling a fuel pump, the control apparatus comprising:
   an electronic switch provided in a circuit for connecting a power supply to a motor for driving the fuel pump;
   a current detector which detects a current which flows through the motor; and a controller which controls the electronic switch to drive the fuel pump using a first PWM signal having a first frequency and a first duty ratio and, when the current flowing through the motor exceeds a threshold current value, controls the electronic switch to drive the fuel pump using a second PWM signal having a second frequency lower than the first frequency and a second duty ratio lower than the first duty ratio.

* * * * *